(12) United States Patent
Yu

(10) Patent No.: US 9,049,557 B2
(45) Date of Patent: Jun. 2, 2015

(54) LANGUAGE SETTING METHOD FOR MOBILE TERMINAL AND MOBILE TERMINAL

(75) Inventor: Hui Yu, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 132 days.

(21) Appl. No.: 13/882,163

(22) PCT Filed: Feb. 21, 2011

(86) PCT No.: PCT/CN2011/071126
§ 371 (c)(1),
(2), (4) Date: Apr. 26, 2013

(87) PCT Pub. No.: WO2012/055194
PCT Pub. Date: May 3, 2012

(65) Prior Publication Data
US 2013/0217377 A1 Aug. 22, 2013

(30) Foreign Application Priority Data
Oct. 28, 2010 (CN) .......................... 2010 1 0523690

(51) Int. Cl.
H04W 4/02 (2009.01)
H04W 4/22 (2009.01)
H04W 4/00 (2009.01)
H04W 4/12 (2009.01)
H04W 64/00 (2009.01)
H04M 1/725 (2006.01)

(52) U.S. Cl.
CPC .......... *H04W 4/025* (2013.01); *H04M 1/72572* (2013.01); *H04M 2250/58* (2013.01)

(58) Field of Classification Search
CPC .. H04B 10/116; H04B 10/11; H04B 10/1143; H04B 10/1149; H04B 10/516; H04B 10/541; H04B 1/20; H04B 1/202; H04B 5/0031; H04W 4/001; H04W 4/20; H04W 4/00; H04W 4/02; H04W 4/021; H04W 4/22
USPC .............. 455/565, 412.1, 418, 419; 705/14.4, 705/14.41, 14.73, 26.4, 26.41, 26.81; 379/433.09; 717/114; 370/328, 352; 701/2, 8, 9, 235
See application file for complete search history.

(56) References Cited

U.S. PATENT DOCUMENTS

2003/0215074 A1* 11/2003 Wrobel .................... 379/142.04
2006/0046785 A1* 3/2006 Cagney ......................... 455/565

(Continued)

FOREIGN PATENT DOCUMENTS

| CN | 1242664 A | | 1/2000 | |
|---|---|---|---|---|
| CN | 1505371 A | | 6/2004 | |
| CN | 101754367 | * | 6/2010 | ............ H04M 1/725 |

(Continued)

OTHER PUBLICATIONS

International Search Report for PCT/CN2011/071126, mailed on Aug. 4, 2011, in 2 pages.

*Primary Examiner* — Inder Mehra
(74) *Attorney, Agent, or Firm* — Procopio, Cory, Hargreaves & Savitch LLP

(57) ABSTRACT

The disclosure discloses a language setting method for mobile terminal and mobile terminal, wherein the method includes: the mobile terminal acquires the language used by the current location of the mobile terminal; and the mobile terminal sets the acquired language as the current default language of the mobile terminal. The disclosure achieves the effect of improving the user experience.

13 Claims, 4 Drawing Sheets

(56) References Cited

U.S. PATENT DOCUMENTS

2006/0047412 A1* 3/2006 Lin .............................. 701/200
2009/0215490 A1* 8/2009 Lee et al. ...................... 455/558

FOREIGN PATENT DOCUMENTS

| CN | 101754367 A | 6/2010 |
|----|-------------|--------|
| CN | 101938694 A | 1/2011 |

* cited by examiner

LANGUAGE SETTING METHOD FOR MOBILE TERMINAL AND MOBILE TERMINAL

FIELD OF THE INVENTION

The disclosure relates to the field of communications, in particular to a language setting method for a mobile terminal and a mobile terminal.

BACKGROUND OF THE INVENTION

With the popularity of the mobile communication technology in the world, transnational operation for the mobile communication has emerged, i.e., an operator operates the mobile communication in multiple countries and the mobile terminal (such as mobile phone) belonging to the network operation of the operator is used all around the world.

A mobile phone for such service generally supports multiple language packages, for example, a mobile phone supports both English and French so as to support the shipment to UK and France. However, the default language of such mobile phone may be only English. Under such circumstance, problems may occur if it is sold in France. Specifically, some Frenchmen may not know English, so that they must find out the language setting option with great effort to switch the language when turning on the mobile phone for the first time, thereby seriously affecting the user experience.

Moreover, if the mobile phone only supports English and French, users of other languages (such as Italian) cannot use the mobile phone.

SUMMARY OF THE INVENTION

The main objective of the disclosure is to provide a language setting solution for a mobile terminal, in order to at least solve the problem that the user experience is affected as the mobile terminal cannot adjust the language used according to the service location in the related arts above.

According to one aspect of the disclosure, providing a method for setting a language in a mobile terminal, comprising: acquiring, by the mobile terminal, the language used by a current location of the mobile terminal; and setting, by the mobile terminal, the acquired language as a current default language of the mobile terminal.

Preferably, the step of acquiring by the mobile terminal, the language of the current location of the mobile terminal includes: determining, by the mobile terminal, that a Subscriber Identity Module (SIM) card being used is a SIM card of the current location of the mobile terminal, using a language corresponding to preferred languages (EFPL) or language indication (EFLI) fields in the SIM card as the acquired language.

Preferably, before the step of acquiring by the mobile terminal, the language used by the current location of the mobile terminal, the method further includes: storing, by the mobile terminal, a table of corresponding relationship between MCCs and languages.

Preferably, before the step of acquiring by the mobile terminal, the language used by the current location of the mobile terminal, the method further includes: storing, by the mobile terminal, a table of corresponding relationship between MMCs and languages.

Preferably, a configuration value for indicating the language of a predetermined location of the mobile terminal is saved in the mobile terminal, and the step of acquiring, by the mobile terminal, the language used by the current location of the mobile terminal includes: the mobile terminal uses the language indicated by the configuration value as the acquired language.

Preferably, before the step of setting, by the mobile terminal, the acquired language as the current default language of the mobile terminal, the method further includes: determining, by the mobile terminal, that a language package of the acquired language is not stored, and downloading, by the mobile terminal, the language package.

Preferably, the step of downloading, by the mobile terminal, the language package includes: prompting, by the mobile terminal, a user to download the language package, and downloading, by the mobile terminal, the language package after a download instruction is received from the user.

Preferably, the step of downloading, by the mobile terminal, the language package includes: downloading, by the mobile terminal, the language package from one of the following networks: an online upgrade network of a manufacture of the mobile terminal, a network of an operator of the mobile terminal, and an after-sale maintenance information network of the manufacture of the mobile terminal.

According to another aspect of the disclosure, providing a mobile terminal, comprising: an acquisition module, configured to acquire a language used by a current location of a mobile terminal, and a setting module, configured to set the acquired language as a current default language of the mobile terminal.

Preferably, the acquisition module includes: a determining sub-module, configured to determine that a SIM card being used is a SIM card of the current location of the mobile terminal, and a control sub-module, configured to use a language corresponding to preferred language (EFPL) fields or language indication (EFLI) fields in the SIM card as the acquired language.

Through the disclosure, by the way of the mobile terminal uses the language of the current location as the default language, solving the problem that the user experience is affected as the mobile terminal cannot adjust the language according to the service location in the related arts, thereby achieving the effect of improving the user experience.

BRIEF DESCRIPTION OF THE DRAWINGS

The drawings described herein provide a further understanding of the disclosure and constitute a part of the application. The exemplary embodiments of the disclosure and the illustrations thereof are used for explaining the disclosure, and are not for constituting an improper limitation to the disclosure. In the drawings.

DETAILED DESCRIPTION OF THE EMBODIMENTS

The disclosure will be described below with reference to the drawings and in conjunction with the embodiments in detail. It should be noted that, in case of no conflict, the embodiments of the disclosure and features therein can be combined with each other.

Embodiment I

Figure 1:
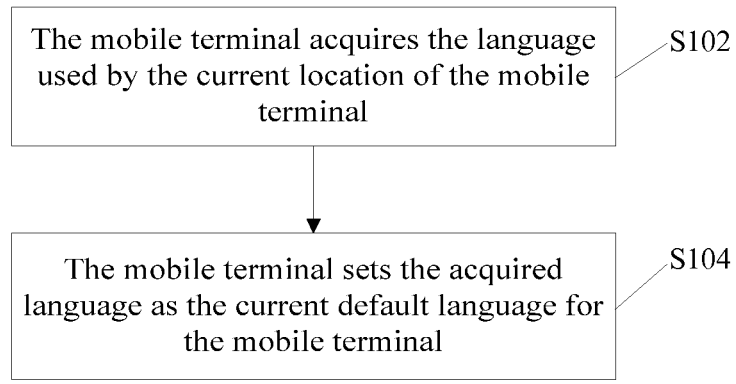
FIG. 1 is a flowchart of a language setting method for a mobile terminal according to one embodiment of the disclosure.

The embodiment of the disclosure discloses a language setting method for a mobile terminal, the method relates to the parameter configuration of a mobile phone, wherein the mobile phone can be one used in either the Global System for Mobile (GSM) network or the Wideband Code Division Multiple Access (WCDMA) network or used in other networks, without being limited in the disclosure. FIG. 1 is a flowchart of a language setting method for a mobile terminal according to one embodiment of the disclosure, as shown in FIG. 1, the method includes:

Step S102: The mobile terminal acquires the language used by the current location of the mobile terminal.

Step S104: The mobile terminal sets the acquired language as the current default language for the mobile terminal.

In the embodiment, the mobile terminal uses the language used by its current location as the default language, so as to achieve the effect of improving the user experience.

Wherein Step S102 may adopt but is not limited to the following three ways:

1. If the mobile terminal determines that the SIM card being used is a SIM card of the current location of the mobile terminal, a language corresponding to the Preferred Language (EFPL) or Language Indication (EFLI) fields in the SIM card is used as the acquired language, wherein the step that the mobile terminal judges whether the SIM card being used is a local one can be realized through the following way: the mobile terminal acquires the country code of the SIM card being used, if the extracted country code is the same as that of the current registered network of the mobile terminal, it means that the current SIM card being used by the mobile terminal is a local one, otherwise, the SIM card being used by the mobile terminal is not a local one.

2. If the SIM card of the mobile terminal does not support a language selection function, Step S102 may include: an MCC is acquired from the registered network information of the mobile terminal, and then a language corresponding to the MCC is found out, and the language is used as the acquired language mentioned above. For example, when the MCC is 460 which represents China, Chinese can be selected as the default language, and when it is 208 which represents France, French can be selected as the default language.

Preferably, the mobile terminal stores the corresponding relationship between MCCs and languages, which may exist either in the form of a table or in other forms. Or, the corresponding relationship may also be stored in a network element of a network, and the mobile terminal can acquire the language corresponding to its MCC through the network element.

3. A configuration value is saved in the mobile terminal, and the configuration value is used for indicating the language of a predetermined service location of the mobile terminal, for example, the predetermined service location is UK, the configuration value indicates English as the language used; and then the mobile terminal may use the language indicated by the configuration value as the acquired language mentioned above.

In a specific embodiment of the disclosure, the mobile terminal may judge whether the language package of the acquired language exists in the mobile terminal at first, if yes, the acquired language is directly set as the current default language, if no, the language package needs to be downloaded at first. For example, language packages of English and Chinese have been stored in the mobile terminal when the mobile terminal is produced, if it is determined that the language used by the location of the mobile terminal is English, the language package of English stored in the mobile terminal can be directly used without downloading.

Wherein the mobile terminal may download the language package automatically, or may download the language package by prompting to a user. The process that the mobile terminal downloads the language package by prompting to a user may include: the mobile terminal prompts the user to download the language package, possibly by popping a corresponding dialog box; then, a user selects whether to download, and if the mobile terminal receives a download instruction from the user, the language package will be downloaded.

Preferably, the mobile terminal downloads the language package from one of the following networks: online upgrade network of the manufacture of the mobile terminal, network of the operator of the mobile terminal, and after-sale maintenance information network of the manufacture of the mobile terminal.

Embodiment II

The objective of the embodiment is to provide a method for setting a language in a mobile terminal, so as to solve the problem that the system cannot automatically use the local language as the language of the mobile phone when a user uses a local SIM card in a foreign country. The embodiment mainly includes two parts: one is automatic selection process of the language and the other is acquisition process of resources required for the corresponding language. They are described below in detail.

First part: the Implementation of a language selection, three language selection ways are provided in the embodiment.

1. A startup language is set by the Preferred Language (EFPL) or Language Indication (EFLI) fields in the SIM card of the mobile phone.

When a user goes to another country and uses a local SIM card of the operator, the mobile phone system will check the EFPL or EFLI fields in the SIM card and compare them with the languages supported by the terminal, so as to determine the selection of a startup default language. For example, the mobile phone reads out the requirement of the default language is that the first language is English and the second language is French, while the languages supported by the mobile phone are English and Chinese, then English is set as the default language. If the mobile phone does not support English, it is necessary to acquire the language package, which will be described in the second part.

2. For the SIM card not supporting language fields, the current language may be determined by parsing Public Land Mobile Network (PLMN) in the network signal.

After a mobile phone is turned on, the registered network information PLMN includes an MCC and a Mobile Network Code (MNC). The current country can be located by the MCC. A configuration table is pre-saved in the mobile phone, which records the corresponding languages of each MCC and MNC. Then, the read information is compared with the information in the table stored in the flash memory of the mobile phone, and which language should be used now can be determined.

Table 1 shows the corresponding relationship between MCCs, MNCs and languages. For example, the registered PLMN of China Mobile Network is 0x46000F, while the PLMN of China Unicom is 0x46001F, and their corresponding country codes (i.e., MCCs) are both 460 (China), so it can be seen that both their corresponding default languages are simplified Chinese with reference to Table 1.

TABLE 1

| Networks | MCC | MNC | Language |
|---|---|---|---|
| China Mobile | 460 | 00 | simplified Chinese (zh) |
| China Unicom | 460 | 01 | simplified Chinese (zh) |
| S.F.R | 208 | 10 | French (fr) |
| TIM | 222 | 01 | Italian (it) |

The finally selected language will be directly set as the default language if being supported by the mobile phone, but if the language is not supported by the mobile phone, the language package of the language will be acquired.

3. If the inserted SIM card does not support language fields, and no network signal can be used for judgment when a user turns on the mobile phone, the configuration value saved in the FLASH may be used for determining the default language; and the configuration value varies according to different shipment destinations. For example, English is the default language when the mobile phone is shipped to UK and America, and Chinese is the default language when the mobile phone is shipped to Southeast Asia. In addition, the default language may not be hard-coded but is configured by a configuration file, thereby customization may be improved.

Second part: Automatic acquisition of language package

The mobile phone largely depends on the support of a font library and the translation of existed menu strings to support multiple languages (not including input method, the same below); and the support of the font library and the translation of existed menu strings are completed by a plurality of resource files stored in the FLASH. The extra language means the extra configuration of such resource files. For example, the language string file corresponding to English is defined as Eng.bar, the language string file of French is defined as Fra.bar, and the file for fonts is Font.dat.

Based on this principle, after the default language should be used is determined, the FLASH of the mobile phone is searched to find whether there is the language package to be used, if yes, the language package is directly used, if no, the automatic acquisition flow for the language package is started.

Wherein the automatic acquisition flow for the language package includes: a user is prompted about whether to download the language package from the specified network. The specified network may be an online update network of either the manufacturer or the operator, or an after-sale maintenance information network of the manufacturer. After the user clicks a download button, a browser is started to be directly linked to a webpage with the language package for download (the connection address of the webpage may be built into the configuration of the mobile phone). After the download is successful, the relevant file is replaced. It should be noted that the security of the original file requires attention in case of file replacement in the download process, and before it is guaranteed that the download is successful, a necessary backup should be made to the original file (such as, storing it to the memory).

With the modification above, the original language setting of the mobile phone also needs some modifications. Expect for the automatic setting option, there is no other option fixed for the user to select, the other options should be dynamically determined according to the corresponding language BAR of the language package. For example, if only Eng.bar is found in the corresponding string directory, two options: "auto- matic" and "English" should exist in the language setting menu. After a language package for French is downloaded, both Eng.bar and Fra.bar are found in the string directory, so three options: "automatic", "English" and "French" should exist in the language setting menu.

Accordingly, it is not necessary to pre-store a large amount of language packages in the mobile phone, and the language package is directly downloaded from a network if necessary, so as to save the memory space.

Embodiment III

Figure 2:
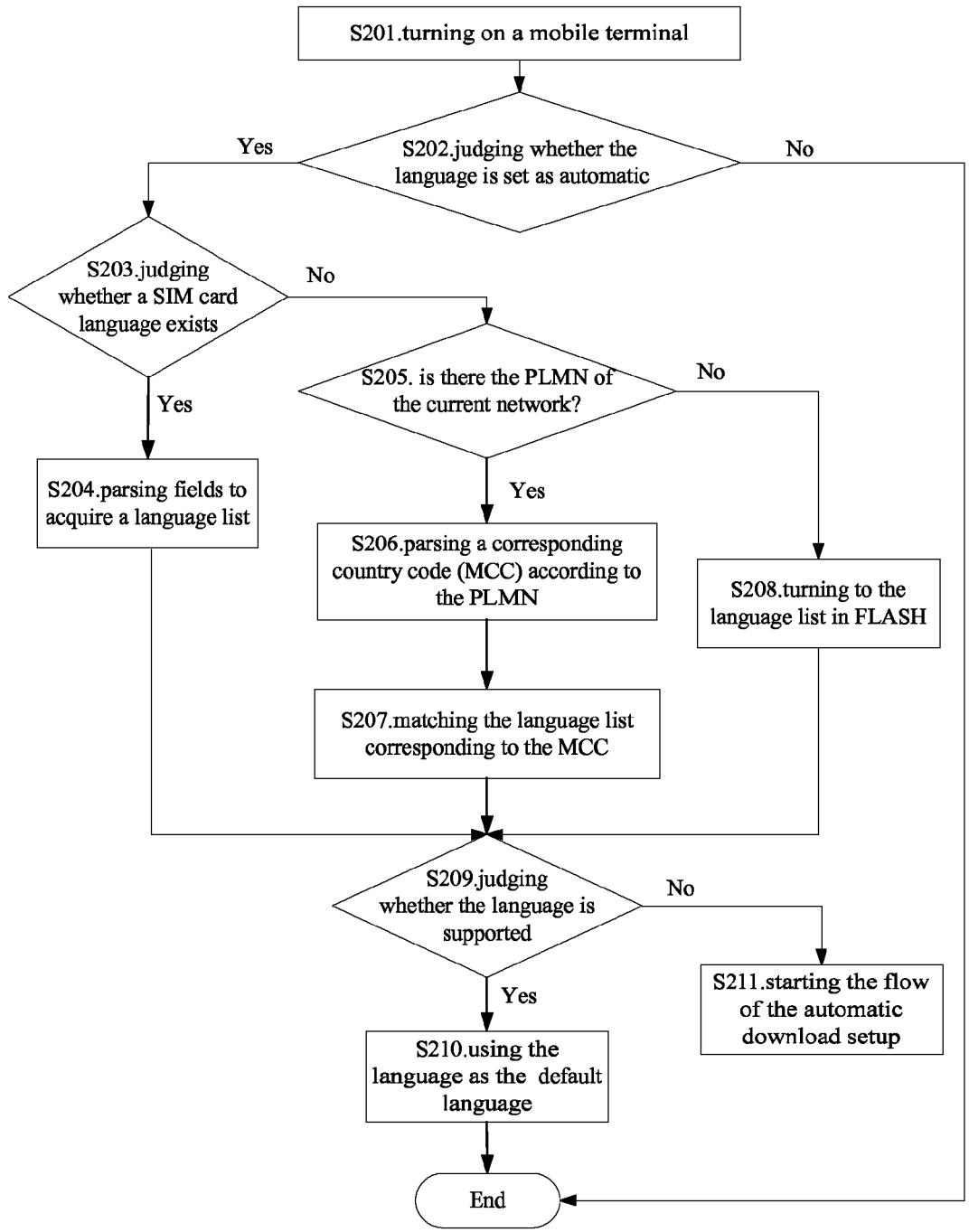
FIG. 2 is a flowchart of a language setting method according to one embodiment of the disclosure.

FIG. 2 is a flowchart of a language setting method according to the embodiment of the disclosure, as shown in FIG. 2, the method includes:

Step S201, turning on a mobile terminal (such as, mobile phone).

Step S202, judging whether the language is set as automatic, if yes, executing Step S203, otherwise, exiting the flow of automatic language setup and adopting the language set last time.

Step S203, judging whether the SIM card supports a language selection, if yes, executing Step S204, otherwise, executing Step S205.

Step S204, reading the EFPL or EFLI fields in the SIM card, parsing which language the fields represent. Then, executing Step S209.

Step S205, judging whether there is a network at the moment, if yes, executing Step S206, otherwise, executing Step S208.

Step S206, parsing the MCC according to the PLMN, and then executing Step S207.

Step S207, matching the MCC with a table in the mobile phone to obtain a corresponding language, then, executing Step S209.

Step S208, using the default language.

Step S209, finding whether the mobile phone exists such language, if yes, executing Step S210, otherwise, executing Step S211.

Step S210, using the language as the current language.

Step S211, starting the flow of the automatic download setup, and setting the downloaded language as the current language of the mobile phone.

The embodiment describes how to automatically set the language after the mobile phone is turned on.

Figure 3:
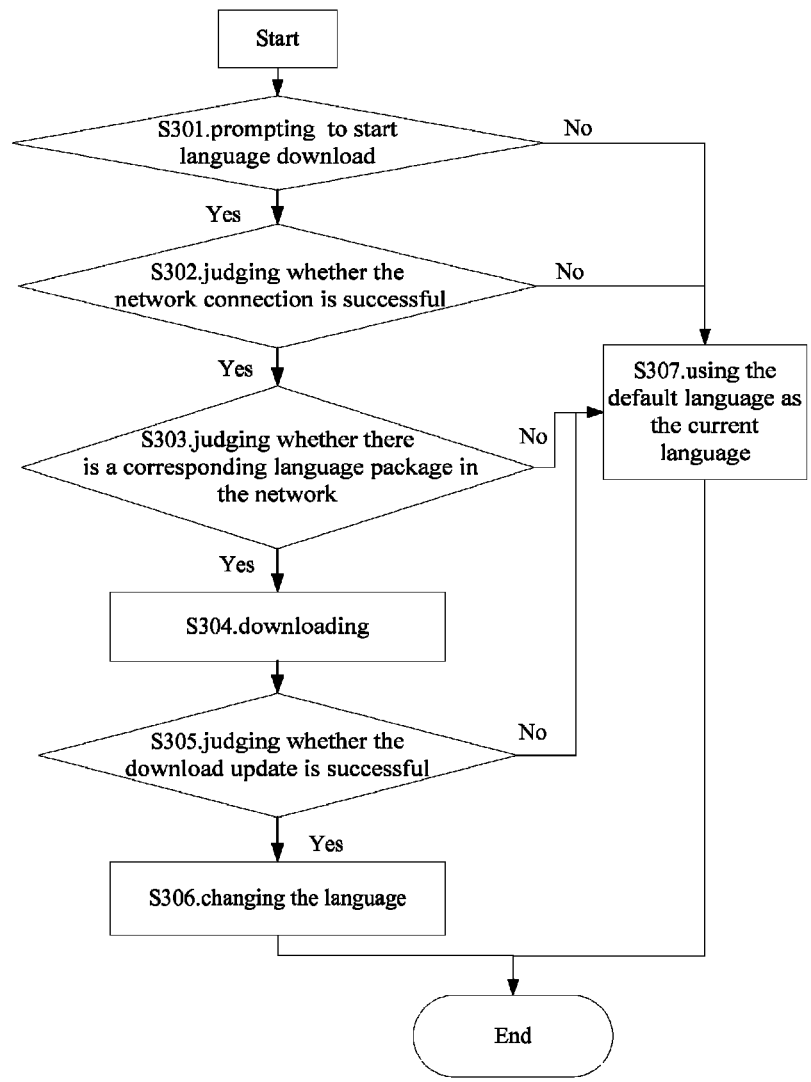
FIG. 3 is a flowchart of a download process of a language setting method according to one embodiment of the disclosure.

FIG. 3 is a flowchart of a download setup method for the language according to the embodiment, as shown in FIG. 3, the method includes:

Step S301, prompting a user to start language download, if the user chooses to start the language download, executing Step S302, otherwise, executing Step S307.

Step S302, judging whether the network connection is successful, if yes, executing Step S303, otherwise, executing Step S307.

Step S303, judging whether there is a corresponding language package in the network, if yes, executing Step S304, otherwise, executing Step S307.

Step S304, downloading the language package.

Step S305, judging whether the download is successful, if yes, executing Step S306, otherwise, executing Step S307.

Step S306, replacing the current language with the downloaded language.

Step S307, Using the default language as the current language.

The embodiment further provides a mobile terminal, which is configured to implement the method above. The mobile terminal may be a mobile phone.

Figure 4:
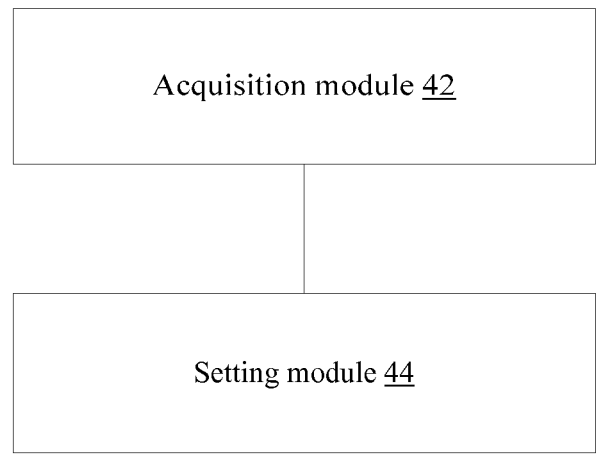
FIG. 4 is a diagram showing the structure of a mobile terminal according to one embodiment of the disclosure.

FIG. 4 is a diagram showing the structure of a mobile terminal according to the embodiment of the disclosure, as shown in FIG. 4, the mobile terminal includes: an acquisition module 42, configured to acquire the language used by the current location of the mobile terminal, and a setting module 44, coupled to the acquisition module 42, configured to set the acquired language as the current default language of the mobile terminal.

Figure 5:
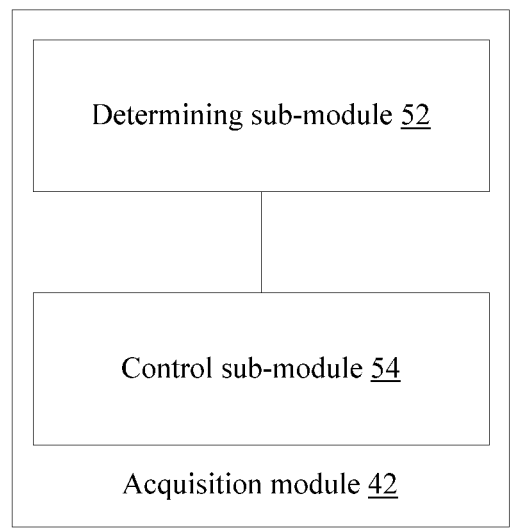
FIG. 5 is a diagram showing the structure of an acquisition module 42 according to one embodiment of the disclosure.

In one preferred example of the embodiment of the disclosure, FIG. 5 is a diagram showing the structure of the acquisition module 42 according to the embodiment of the disclosure, as shown in FIG. 4, the acquisition module 42 may include: a determining sub-module 52, configured to determine that the SIM card being used is a SIM card of the current location of the mobile terminal, and a control sub-module 54, coupled to the determining sub-module 52, configured to use a language corresponding to the preferred language fields or language indication fields in the SIM card as the acquired language.

In another preferred example of the embodiment of the disclosure, the acquisition module 42 may include: an acquisition sub-module, configured to acquire the MCC in the registered network information of the mobile terminal, and a using sub-module, coupled to the acquisition sub-module, configured to use a language corresponding to the MCC as the acquired language. Preferably, in the example, the mobile terminal may further include: a storing module, configured to store a table of the corresponding relationship between MCCs and languages.

In another preferred example of the embodiment of the disclosure, the mobile terminal may further include: a saving module, configured to save a configuration value for indicating the language of the predetermined service location of the mobile terminal. Meanwhile, the acquisition module 42 can use the language indicated by the configuration value as the language used by the current location of the mobile terminal.

Preferably, the mobile terminal may further include: a determining module and a downloading module, wherein the determining module is configured to determine that the language package of the language acquired by the acquisition module 40 is not stored and to trigger the downloading module, and the downloading module is configured to download the language package.

Preferably, the downloading module include: a prompt sub-module, configured to prompt a user to download the language package; and a downloading sub-module, configured to download the language package after a download instruction is received from the user.

Preferably, the downloading module downloads the language package from one of the following networks: an online upgrade network of a manufacture of the mobile terminal, a network of an operator of the mobile terminal, and an after-sale maintenance information network of the manufacture of the mobile terminal.

To sum up, the mobile terminal uses the language of the current service location as the default language according to the embodiments of the present disclosure, so as to improve the user experience.

Obviously, those skilled in the art should understand that the modules or steps of the disclosure may be implemented by general computing devices and centralized in a single computing device or distributed in a network consisting of multiple computing devices. Optionally, the modules or steps may be implemented by program codes executable by the computing devices, so that they may be stored in storage devices and executed by the computing devices, or they may be realized by being respectively made into individual integrated circuit modules or a plurality of modules or steps may be made into a single integrated circuit module. By doing so, the disclosure is not limited to any specific combination of hardware and software.

The above are only preferred embodiments of the disclosure and should not be used to limit the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for setting a language in a mobile terminal, comprising:
   acquiring, by the mobile terminal, the language used by a current location of the mobile terminal; and
   setting, by the mobile terminal, the acquired language as a current default language of the mobile terminal,
   wherein before the step of setting, by the mobile terminal, the acquired language as the current default language of the mobile terminal, the method further comprises:
   determining, by the mobile terminal, that a language package of the acquired language is not stored; and
   downloading, by the mobile terminal, the language package.

2. The method according to claim 1, wherein the step of acquiring, by the mobile terminal, the language used by the current location of the mobile terminal comprises:
   determining, by the mobile terminal, that a Subscriber Identity Module (SIM) card being used is the SIM card of the current location of the mobile terminal; and
   using a language corresponding to preferred language (EFPL) fields or language indication (EFLI) fields in the SIM card as the acquired language.

3. The method according to claim 2, wherein before the step of setting, by the mobile terminal, the acquired language as the current default language of the mobile terminal, the method further comprises:
   determining, by the mobile terminal, that a language package of the acquired language is not stored; and
   downloading, by the mobile terminal, the language package.

4. The method according to claim 1, wherein the step of acquiring, by the mobile terminal, the language used by the current location of the mobile terminal comprises:
   acquiring a Mobile Country Code (MCC) in registered network information of the mobile terminal; and
   using the language corresponding to the MCC as the acquired language.

5. The method according to claim 4, wherein before the step of acquiring, by the mobile terminal, the language used by the current location of the mobile terminal, the method further comprises:
   storing, by the mobile terminal, a table of corresponding relationship between MCCs and languages.

6. The method according to claim 5, wherein before the step of setting, by the mobile terminal, the acquired language as the current default language of the mobile terminal, the method further comprises:
   determining, by the mobile terminal, that a language package of the acquired language is not stored; and
   downloading, by the mobile terminal, the language package.

7. The method according to claim 4, wherein before the step of setting, by the mobile terminal, the acquired language as the current default language of the mobile terminal, the method further comprises:

determining, by the mobile terminal, that a language package of the acquired language is not stored; and
downloading, by the mobile terminal, the language package.

8. The method according to claim 1, wherein
a configuration value for indicating the language of a predetermined location of the mobile terminal is saved in the mobile terminal; and
the step of acquiring, by the mobile terminal, the language used by the current location of the mobile terminal comprises: using, by the mobile terminal, the language indicated by the configuration value as the acquired language.

9. The method according to claim 8, wherein before the step of setting, by the mobile terminal, the acquired language as the current default language of the mobile terminal, the method further comprises:
determining, by the mobile terminal, that a language package of the acquired language is not stored; and
downloading, by the mobile terminal, the language package.

10. The method according to claim 1, wherein the step of downloading, by the mobile terminal, the language package comprises:
prompting, by the mobile terminal, a user to download the language package; and
downloading, by the mobile terminal, the language package after a download instruction is received from the user.

11. The method according to claim 1, wherein the step of downloading, by the mobile terminal, the language package comprises:
downloading, by the mobile terminal, the language package from one of the following networks: an online upgrade network of a manufacture of the mobile terminal, a network of an operator of the mobile terminal, and an after-sale maintenance information network of the manufacture of the mobile terminal.

12. A mobile terminal, comprising:
an acquisition module, configured to acquire a language used by a current location of the mobile terminal, and
a setting module, configured to set the acquired language as a current default language of the mobile terminal;
wherein the mobile terminal is further configured to, before setting the acquired language as the current default language of the mobile terminal, determine that a language package of the acquired language is not stored, and download the language package.

13. The mobile terminal according to claim 12, wherein the acquisition module comprises:
a determining sub-module, configured to determine that a Subscriber Identity Module (SIM) card being used is the SIM card of the current location of the mobile terminal, and
a control sub-module, configured to use a language corresponding to preferred language (EFPL) fields or language indication (EFLI) fields in the SIM card as the acquired language.

* * * * *